United States Patent
Tence et al.

(10) Patent No.: US 9,541,445 B2
(45) Date of Patent: Jan. 10, 2017

(54) OPTICAL LEVEL SENSOR FOR REFLECTIVE LIQUIDS

(71) Applicant: Xerox Corporation, Norwalk, CT (US)

(72) Inventors: David A. Tence, Tualatin, OR (US);
Matthew D. Savoy, Webster, NY (US);
David B. Tait, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/680,844

(22) Filed: Apr. 7, 2015

(65) Prior Publication Data

US 2016/0298997 A1 Oct. 13, 2016

(51) Int. Cl.
*G01F 23/292* (2006.01)
*B41J 2/175* (2006.01)

(52) U.S. Cl.
CPC ........ *G01F 23/2925* (2013.01); *B41J 2/17566* (2013.01); *B41J 2002/17573* (2013.01)

(58) Field of Classification Search
CPC ................ G01F 23/2925; B41J 2/17566; B41J 2002/17573
See application file for complete search history.

(56) References Cited

U.S. PATENT DOCUMENTS

| | | | |
|---|---|---|---|
| 4,274,705 A | 6/1981 | Miller | |
| 4,354,180 A | 10/1982 | Harding | |
| 4,870,292 A | 9/1989 | Alpert et al. | |
| 4,904,878 A | 2/1990 | Gipp et al. | |
| 5,381,022 A | 1/1995 | Nemeth et al. | |
| 5,880,480 A * | 3/1999 | Ellinger | G01F 23/2925 250/577 |
| 6,361,136 B1 * | 3/2002 | Watanabe | B41J 2/17546 347/19 |
| 6,363,784 B1 | 4/2002 | Gregory | |
| 7,161,165 B2 | 1/2007 | Wirthlin | |
| 2013/0286116 A1 * | 10/2013 | Takahashi | B41J 2/18 347/92 |

* cited by examiner

*Primary Examiner* — Bradley Thies
(74) *Attorney, Agent, or Firm* — Maginot Moore & Beck LLP

(57) ABSTRACT

An optical sensor enables a level of reflective fluid to be detected. The optical sensor includes a prism mounted at one end of a housing. The prism has an exterior surface that is parallel to the end of the housing and a width that corresponds to a width of the end of the housing. A photoemitter and a photodetector are mounted at another end of the housing to enable light emitted by the photoemitter to be reflected by the prism when the prism contacts reflective fluid and to enable light emitted by the photoemitter to pass out of the sensor when the prism is in contact with air.

7 Claims, 5 Drawing Sheets

OPTICAL LEVEL SENSOR FOR REFLECTIVE LIQUIDS

TECHNICAL FIELD

This disclosure relates generally to printers that store inks in reservoirs, and in particular, to printers that store at least one ink that is a reflective ink.

BACKGROUND

Several types of level sensors are currently used to detect a height of an ink in an ink supply reservoir in printers. The word "printer" as used in this documents means any apparatus, such as digital copier, bookmaking machine, facsimile machine, multi-function machine, etc. which produces an ink image on media for any purpose. Examples of the level sensors include: (1) conductive level sense probes; (2) over-driven thermistors; (3) vibrating beams; and (4) optical sensors.

Known optical sensors include a photoemitter and photodetector positioned at one end of a housing and an optical prism at the other end of the housing. Such a sensor is shown in FIG. 5A. The sensor 300 has a base 304 and a housing 308 that terminates in a glass prism 312. The glass prism has a conical shape for purposes noted below. A photoemitter 316, such as an LED or other coherent light source, is positioned in the base 304. A photodetector 320 is also positioned in the base at a position that is approximately adjacent to the photoemitter. A non-reflective liquid level 324 is also shown in the figure. When the photoemitter is activated to generate a beam of light as shown in the figure, the conical prism totally internally reflects (TIR) the light on a path that is parallel to the emitted light beam so it strikes the photodetector, which generates an electrical signal that is inversely proportional to the intensity of the light striking the photodetector. When the prism 312 of the sensor 300 is immersed in a non-reflective liquid as shown in FIG. 5B, the differences in the coefficients of refraction at the interface of the prism and the non-reflective liquid enable most of the emitted light beam to pass through the prism and into the liquid. Thus, the photodetector 320 generates an electrical signal that has a voltage that is greater than the one produced when the sensor is not immersed in non-reflective fluid. Therefore, the response of the photodetector 320 indicates whether the sensor 300 detects the non-reflective liquid or not. Placing the sensor 300 at positions corresponding to levels where an ink supply needs replenishment, a controller can operate a pump or the like to send ink to the reservoir in which the sensor 300 is located.

A problem arises when the sensor 300 is positioned within an ink reservoir that contains a reflective ink, such as a white colored ink. In such a reservoir, the reflective ink directs ambient light reflected from the ink into the photodetector when the ink covers the prism. Consequently, the photodetector still generates an electrical signal that approximately the same level as the one it generates when the reflective ink level is below the prism. Thus, the sensor 300 is inoperative in reflective ink. Being able to obtain the advantages of optical level sensors in reflective fluids would be useful.

SUMMARY

A reflective ink level optical sensor having a cylindrical prism, rather than a conical prism, has been observed to enable detection of the presence and absence of ink in an ink reservoir. The ink level optical sensor includes a housing having a volume and a first end and a second end, a base configured to close the first end of the housing, a photoemitter positioned in the base, a photodetector positioned in the base, and a prism configured to close the second end of the housing, the prism having an exterior surface that is parallel to the second end of the housing and the exterior surface having a width corresponding to a width of the second end of the housing to enable the photodetector to generate a signal indicative of whether a reflective fluid is contacting the prism.

A method of manufacturing the reflective ink level optical sensor enables the sensor to made from previously known non-reflective ink level optical sensors. The method includes removing a conical portion of a conical prism in a sensor to form a flat surface prism in the sensor, the sensor having a housing with a volume and a first end and a second end, a base configured to close the first end of the housing, a photoemitter positioned in the base, a photodetector positioned in the base, the flat surface prism closing the second end of the housing, the flat surface prism having an exterior surface that is parallel to the second end of the housing and the exterior surface having a width corresponding to a width of the second end of the housing to enable the photodetector to generate a signal indicative of whether a reflective fluid is contacting the prism.

An ink supply for a printer incorporates a reflective ink level optical sensor having a cylindrical prism, rather than a conical prism, to enable both reflective and non-reflective ink levels to be supplied to reservoirs in the printer. The ink supply includes a volumetric container for storing reflective fluid, a reservoir having an internal volume, a pump configured to move reflective fluid from the volumetric container to the internal volume of the reservoir, at least one sensor positioned within the internal volume of the reservoir, the at least one sensor being configured to detect a presence and an absence of reflective fluid contacting the at least one sensor, and a controller operatively connected to the at least one sensor and the pump, the controller being configured to receive a signal from the at least one sensor indicative of whether the at least one sensor is contacting reflective ink within the internal volume of the reservoir and to operate the pump to move reflective fluid from the volumetric container into the internal volume of the reservoir in response to the signal from the at least one sensor indicating an absence of reflective fluid contacting the at least one sensor.

DETAILED DESCRIPTION OF THE PREFERRED EMBODIMENT

Figure 1A:
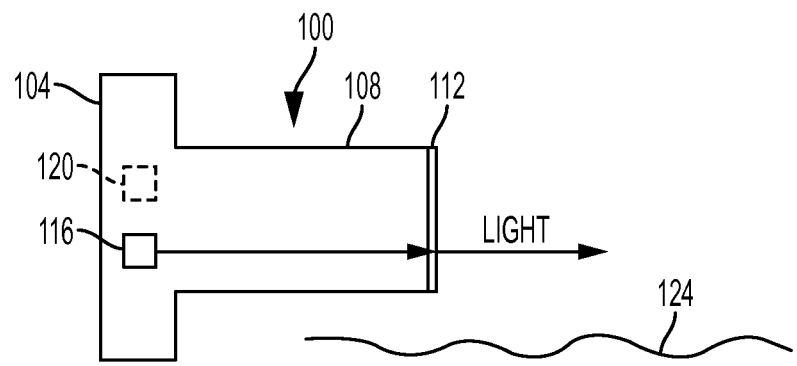
FIG. 1A is a schematic diagram of an optical sensor detecting the absence of reflective fluid at the sensor.

For a general understanding of the system disclosed herein as well as the details for the system and method, reference is made to the drawings. In the drawings, like reference numerals have been used throughout to designate like elements.

Figure 1B:
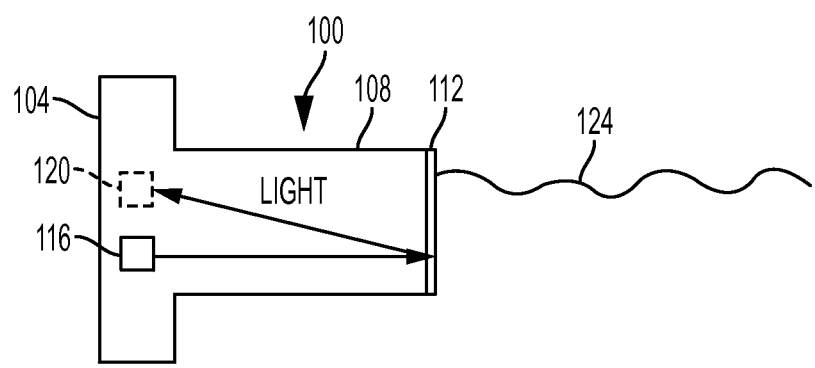
FIG. 1B is a schematic diagram of the optical sensor of FIG. 1A detecting the presence of reflective fluid at the sensor.

Referring now to FIG. 1A, a sensor 100 is shown that detects the presence and absence of reflective fluids. The sensor 100 has a base 104 and a housing 108 that terminates in a glass prism 112. The glass prism 112 has a cylindrical shape, although other shapes can be used provided the exterior surface of the prism is parallel to the end of the housing 108 and the exterior surface of the prism has a width that corresponds to the width of the end of housing in which it is placed as shown in FIGS. 1A and 1B. As used in this document, "prism" means a transparent solid having polished surfaces that refract light. A prism can have at least two flat surfaces that are oriented at an angle to one another or a prism can be conical. The transparent material of a prism can be made from a variety of clear materials including plastic and glass. The sensor 100 can be formed by grinding the prism 312 of sensor 312 to remove the sloping sides of the conical shape to form the cylindrical prism 112. A photoemitter 116, such as an LED or other coherent light source, is positioned in the base 104. A photodetector 120 is also positioned in the base at a position that is approximately adjacent to the photoemitter. A reflective liquid level 124 is also shown in the figure. When the photoemitter is activated to generate a beam of light as shown in the figure, the differences in the coefficients of refraction at the interface of the prism and the air enable most of the emitted light beam to pass through the prism and into the air. Thus, the photodetector 320 generates an electrical signal indicating the sensor is in air. When the prism 112 of the sensor 100 is immersed in a reflective liquid as shown in FIG. 1B, the light emitted by the photoemitter 116 is totally internally reflected (TIR) within the housing 108 by the prism 112 so the light is reflected on a path that is parallel to the emitted light beam. When this reflected light strikes the photodetector 120, it generates an electrical signal that is indicative of the sensor being immersed in reflective fluid. In one embodiment of the sensors described in this document, the intensity of the light on the photodetector cause the generation of an electrical signal that is inversely proportional to the intensity of the light striking the photodetector. That is, the greater the intensity, the smaller the voltage of the signal. Similarly, when little or no light strikes the photodetector, the photodetector generates a logical high value. Therefore, the response of the photodetector 120 indicates whether the sensor 100 detects the reflective liquid or not.

Figure 2:
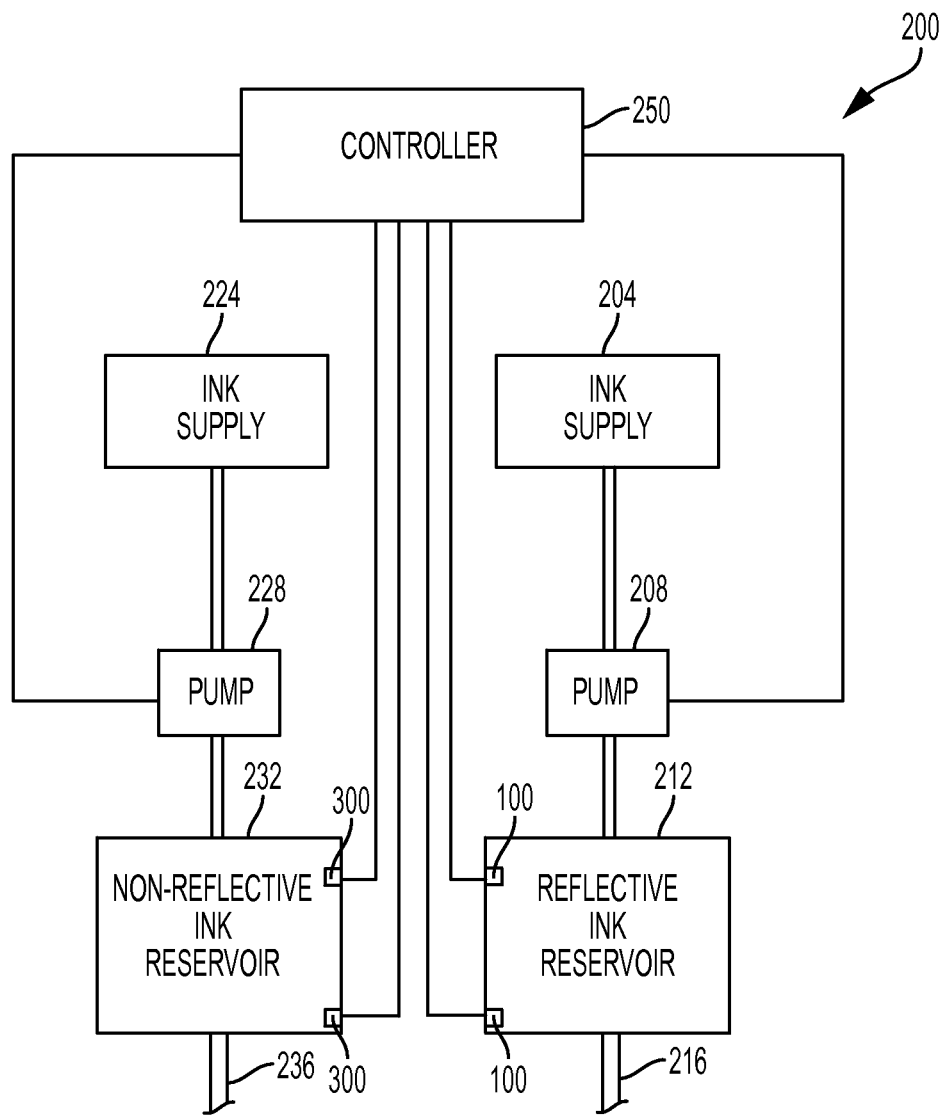
FIG. 2 is a block diagram of an ink supply for a printer that enables a controller to regulate supply of reflective and non-reflective inks to reservoirs in a printer.

Placing the sensor 100 at positions corresponding to levels where an ink supply needs replenishment, a controller can operate a pump or the like to send ink to the reservoir in which the sensor 100 is located as shown in FIG. 2. The ink supply system 200 includes a controller 250 that is operatively connected to two sensors in each of the reservoirs 232 and 212. The reservoir 212 contains reflective ink, which it received from ink supply 204 when the controller operated the pump 208 to provide the ink to the reservoir 212. The reservoir 232 contains non-reflective ink, which it received from ink supply 224 when the controller operated the pump 228 to provide the ink to the reservoir 232. The ink from reservoir 212 and the ink from the reservoir 232 can be provided to a same printhead or different printheads through conduits 216 and 236, respectively. The reservoirs 212 and 232 can be integral to a printhead or they can be remotely located with respect to the printheads they supply.

In more detail, each reservoir includes two optical level sensors. In the reservoir 212, the two sensors have the structure of the sensors 100 shown in FIG. 1A and FIG. 1B. One of the sensors 100 is positioned near a floor of the reservoir to enable the sensor to detect the absence of reflective ink at that position. The controller can respond to the signal indicative of no ink being present by operating the pump 208 to replenish the supply of reflective ink in the reservoir 212. The other sensor 100 is positioned near the high end of the reservoir 212 to detect the presence of ink at that position. The controller can respond to the signal indicative of ink being presence at the upper end of the reservoir by deactivating the pump 208 since the reservoir has been refilled. In a similar manner, the reservoir 232 has two sensors with the structure of the sensors 300 shown in FIG. 3A and FIG. 3B. One of the sensors 300 is positioned near a floor of the reservoir to enable the sensor to detect the absence of reflective ink at that position. The controller can respond to the signal indicative of no ink being present by operating the pump 228 to replenish the supply of reflective ink in the reservoir 232. The other sensor 300 is positioned near the high end of the reservoir 232 to detect the presence of ink at that position. The controller can respond to the signal indicative of ink being presence at the upper end of the reservoir by deactivating the pump 228 since the reservoir has been refilled.

Figure 3:
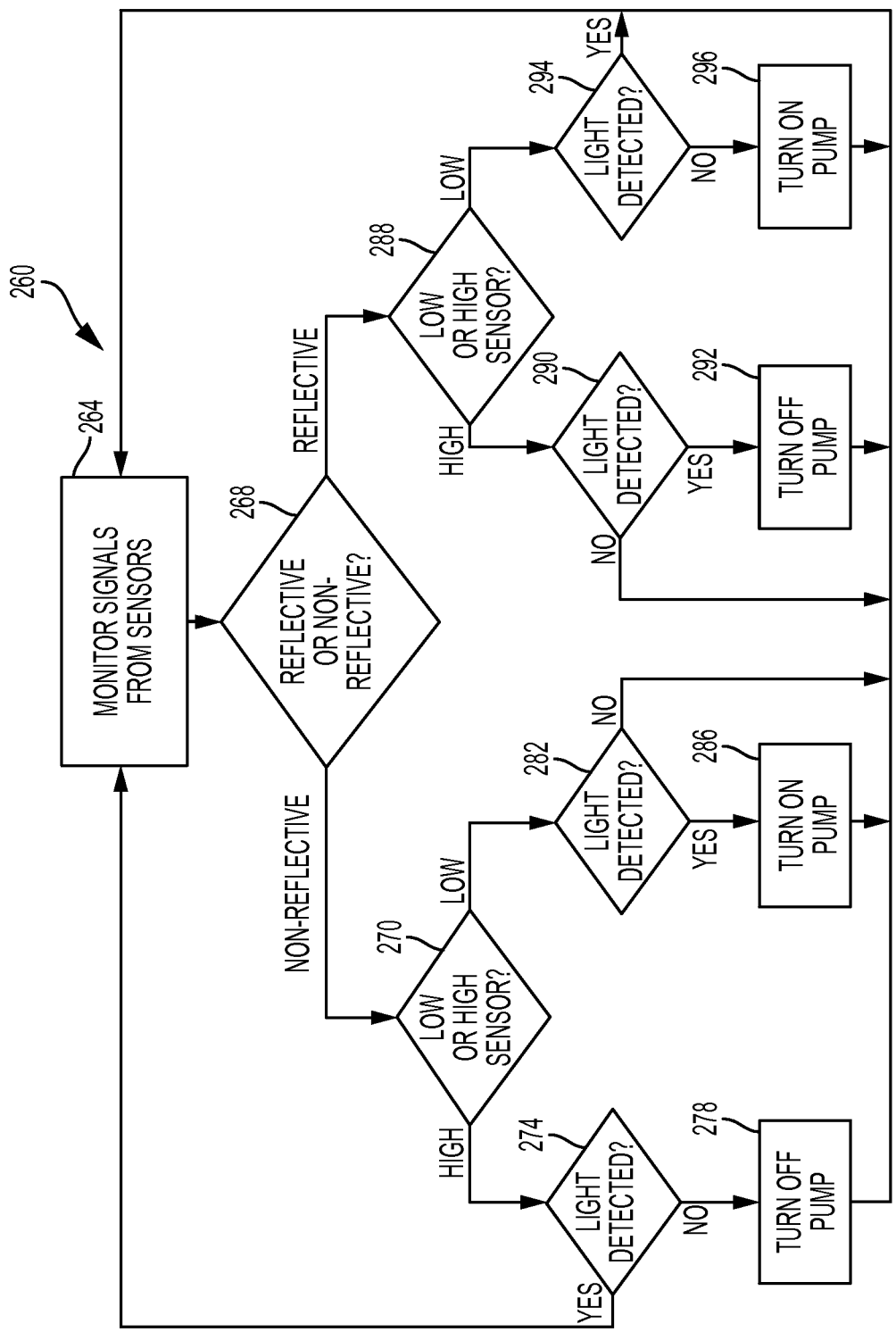
FIG. 3 is a flow diagram of a process used by the controller in FIG. 2 for detecting ink levels in the reservoirs of FIG. 2.

To operate the ink supply system 200, the controller 250 performs the method 260 shown in FIG. 3. The process 260 is described in conjunction with the ink supply system 200 of FIG. 2 for illustrative purposes. While process 260 is described with reference to the ink supply system 200, the process can be adapted to operate other configurations of ink supply systems. The process 260 refers to a controller, such as the controller 250 described above, executing programmed instructions stored in a memory operatively connected to the controller to cause the controller to operate one or more components of the printer to perform the specified function or action described in the process.

In the process 260, the controller 250 monitors the signals from the sensors in the reservoirs operatively connected to the controller (block 264). When a change in a signal occurs, the controller determines whether the signal is from a sensor associated with a reservoir of non-reflective ink or a reservoir of reflective ink (block 268). If the sensor is associated with the reservoir containing reflective ink, the controller determines whether the signal is from the upper or the lower sensor (block 288). If the signal is from the lower sensor, the controller determines whether the signal from the sensor indicates whether the photodetector 120 detects light (block 294). If the signal indicates light is not detected, then the ink level has dropped below the sensor 100 (FIG. 1A) and the controller operates the pump 208 (block 296). Otherwise, the controller returns to monitoring sensor signals (block 264). If the signal from the high sensor is being processed, the controller 250 determines whether the light is detected (block 290). If the signal from the upper sensor 100 detects light, then the reflective ink level has reached the upper sensor 100 (FIG. 1B) so the controller deactivates the pump 208 (block 292). Otherwise, the controller returns to monitoring sensor signals (block 264).

With continued reference to FIG. 3, if the sensor is associated with the reservoir containing non-reflective ink, the controller determines whether the signal is from the upper or the lower sensor (block 270). If the signal is from the lower sensor, the controller determines whether the signal from the sensor indicates whether the photodetector 320 detects light (block 282). If the signal indicates light is detected, then the ink level has dropped below the sensor 300 (FIG. 3A) and the controller operates the pump 228 (block 286). Otherwise, the controller returns to monitoring sensor signals (block 264). If the signal from the high sensor is being processed, the controller 250 determines whether the light is not detected (block 274). If the signal from the upper sensor 300 does not detect light, then the reflective ink level has reached the upper sensor 300 (FIG. 3B) so the controller deactivates the pump 228 (block 278). Otherwise, the controller returns to monitoring sensor signals (block 264). The reader should note that the logic of evaluating the signals from the sensors 100 is the opposite polarity than the logic of evaluating the signals from the sensors 300.

While the ink supply system and its method of operation have been described with reference to a reservoir in which two sensors are positioned, a reflective ink supply system can be provided with a single sensor. In this embodiment, the sensor is positioned at a location that operates the pump to provide reflective fluid when the fluid level drops below the sensor and then deactivates the pump when the fluid level reaches the sensor and the sensor detects the fluid level. Such a position in most embodiments is near the upper position shown in FIG. 2, but other positions are possible depending upon the rate of fluid consumption and replenishment.

Figure 4:
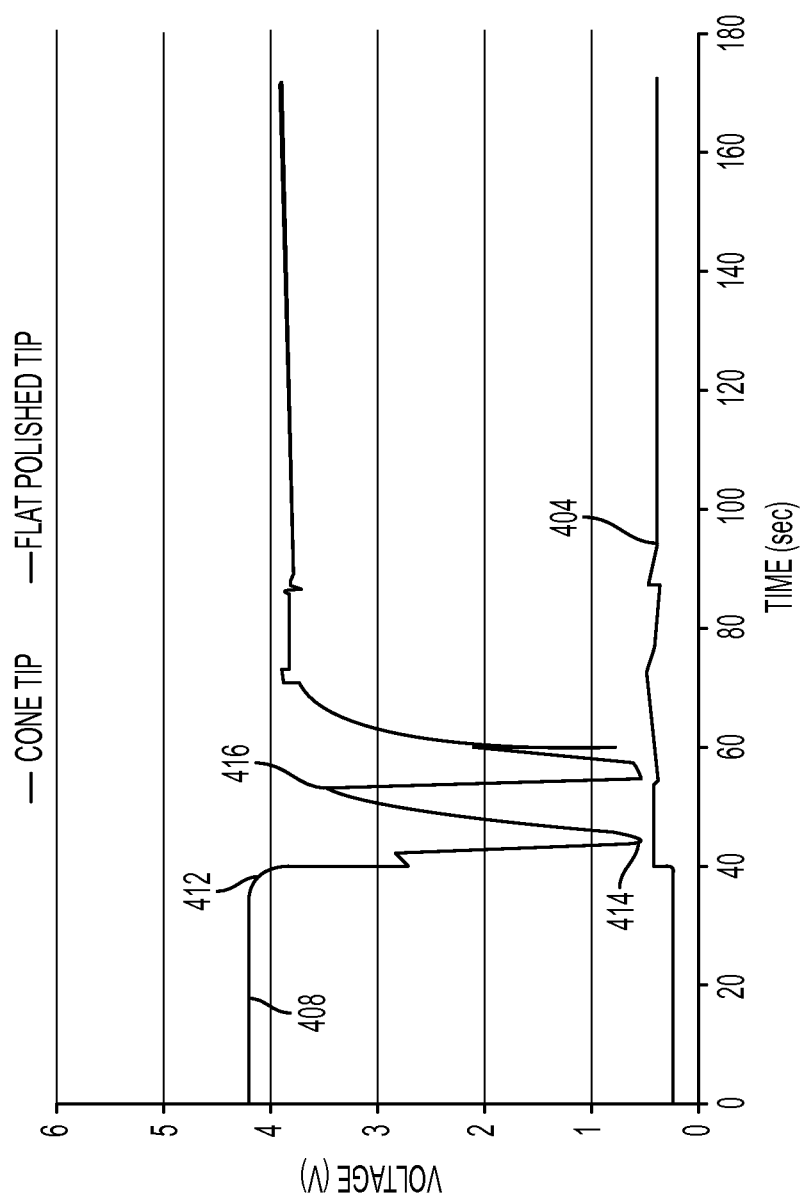
FIG. 4 is a graph of the response of the sensor of FIG. 1A and the sensor of FIG. 5A to reflective ink in a reservoir.
Figure 5A:
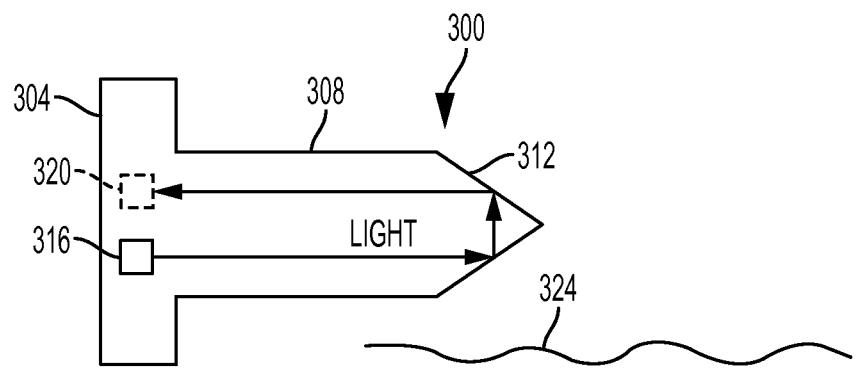
FIG. 5A is a schematic diagram of an optical sensor detecting the absence of non-reflective fluid at the sensor.
Figure 5B:
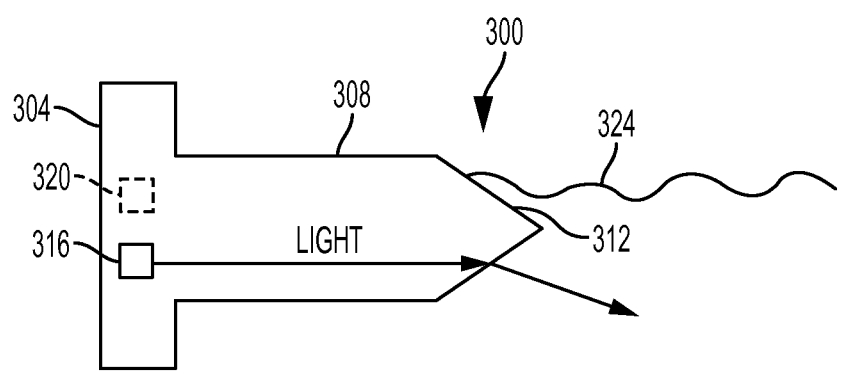
FIG. 5B is a schematic diagram of the optical sensor of FIG. 5A detecting the presence of non-reflective fluid at the sensor.

The graph of FIG. 4 demonstrates that the previously known sensor 300 is impervious to the detection of reflective ink level changes, while the sensor 100 detects changes in reflective ink levels. The line 404 is the signal from the sensor 300 and the line 408 is the signal from the sensor 100. In the embodiment of the sensor 100 plotted in FIG. 4, the presence of light on the photodetector causes the generation of a lower voltage than the voltage of the signal generated when light is not detected by photodetector. At time equal zero seconds, the signal from the sensor 100 indicates light is not being detected so the ink level is below the sensor (FIG. 1A). At the point 412, the ink level begins to rise and continues until point 414. At that point, the signal from the sensor 100 is at its lowest level since the ink level has immersed the sensor (FIG. 1B). The reservoir begins draining at that point so the signal climbs to the level 416 as less of the sensor contacts the reflective fluid. The signal does not return to the level at point 412 because the prism 112 does not fully dry so some of the ink on the prism reflects some degree of light to the photodetector. The graph of FIG. 4 shows another cycle of ink level refilling followed by draining before remaining at the level below the sensor 100. Again, the signal 404 from the sensor 300 never transitions despite the changes in reflective ink levels.

It will be appreciated that various of the above-disclosed and other features and functions, or alternatives thereof, may be desirably combined into many other different systems or applications. For example, while the sensor and supply system have been described with reference to reflective ink, the sensor and system can be used with other reflective fluids. Various presently unforeseen or unanticipated alternatives, modifications, variations, or improvements therein may be subsequently made by those skilled in the art which are also intended to be encompassed by the following claims.

What is claimed is:

1. An optical sensor for detecting a presence and an absence of reflective fluid comprising:

a housing having at least one wall that encloses a volume and the at least one wall has a first end and a second end;

a base configured to close the first end of the at least one wall of the housing;

a photoemitter positioned in the base;

a photodetector positioned in the base; and a prism configured to close the second end of the at least one wall of the housing, the prism having no sloped surfaces, at least one surface of the prism is parallel to the second end of the at least one wall of the housing, and the at least one surface of the prism has a width approximately equal to a width of the second end of the at least one wall of the housing to enable the photodetector to generate a signal indicative of whether a reflective fluid is contacting the prism.

2. The optical sensor of claim 1, wherein the at least one wall of the housing is a cylinder having a same diameter at the first end and the second end and the prism is a cylinder and the at least one surface of the cylinder has a diameter that is approximately equal to the same diameter of the first end and the second end of the at least one wall of the housing.

3. An reflective fluid supply system for a printer comprising:

a volumetric container for storing reflective fluid;

a reservoir having an internal volume;

a pump configured to move reflective fluid from the volumetric container to the internal volume of the reservoir;

at least one sensor positioned within the internal volume of the reservoir, the at least one sensor being configured with a housing having at least one wall that encloses a volume and the at least one wall has a first end and a second end, a base configured to close the first end of the at least one wall of the housing, a photoemitter positioned in the base, a photodetector positioned in the base, and a prism configured to close the second end of the at least one wall of the housing, the prism having no sloped surfaces, at least one surface of the prism is parallel to the second end of the at least one wall of the housing, and the at least one surface of the prism has a width approximately equal to a width of the second end of the at least one wall of the housing to enable the photodetector to generate a signal indicative of whether a reflective fluid is contacting the prism of the at least one sensor; and a controller operatively connected to the at least one sensor and the pump, the controller being configured to receive a signal from the at least one sensor indicative of whether the at least one sensor is contacting reflective ink within the internal volume of the reservoir and to operate the pump to move reflective fluid from the volumetric container into the internal volume of the reservoir in response to the signal from the at least one sensor indicating an absence of reflective fluid contacting the at least one sensor.

4. The system of claim 3, wherein the at least one wall of the housing is a cylinder having a same diameter at the first end and the second end of the at least one wall and the prism is a cylinder having a diameter equal to the same diameter of the first end and the second end of the at least one wall of the housing of the at least one sensor.

5. The system of claim 3, the at least one sensor further comprising:

a pair of sensors, each sensor in the pair of sensors being configured with a housing having at least one wall that encloses a volume and the at least one wall has a first end and a second end, a base configured to close the first end of the at least one wall of the housing, a photoemitter positioned in the base, a photodetector positioned in the base, and a prism configured to close the second end of the at least one wall of the housing, the prism having no sloped surfaces, at least one surface of the prism is parallel to the second end of the at least one wall of the housing, and the at least one surface of the prism has a width approximately equal to a width of the second end of the at least one wall of the housing to enable the photodetector to generate a signal indicative of whether a reflective fluid is contacting the prism, one of the sensors in the pair of sensors being positioned within the internal volume of the reservoir at a location where the signal generated by the one sensor indicates the reflective fluid level in the reservoir is approaching a floor of the reservoir when the signal indicates an absence of reflective fluid contacting the one sensor;

the other sensor in the pair of sensors being positioned within the internal volume of the reservoir at a location where the signal generated by the other sensor indicates the reflective fluid level in the reservoir is approaching a ceiling of the reservoir when the signal indicates a presence of reflective fluid contacting the other sensor; and the controller is further configured to operate the pump in response to the signal from the one sensor indicating an absence of reflective fluid contacting the one sensor and to deactivate the pump in response to the signal from the other sensor indicating a presence of reflective fluid contacting the other sensor.

6. The system of claim 5 further comprising:

a volumetric container for storing non-reflective fluid;

another reservoir having an internal volume;

another pump configured to move non-reflective fluid from the volumetric container for storing non-reflective fluid to the internal volume of the other reservoir;

at least one sensor positioned within the internal volume of the other reservoir, the at least one sensor in the internal volume of the other reservoir being configured with a housing having at least one wall that encloses a volume and the at least one wall has a first end and a second end, a base configured to close the first end of the at least one wall of the housing, a photoemitter positioned in the base, a photodetector positioned in the base, and a prism configured to close the second end of the at least one wall of the housing, the prism having no sloped surfaces, at least one surface of the prism is parallel to the second end of the at least one wall of the housing, and the at least one surface of the prism has a width approximately equal to a width of the second end of the at least one wall of the housing to enable the photodetector to generate a signal indicative of whether a reflective fluid is contacting the prism to detect a presence and an absence of non-reflective fluid contacting the at least one sensor within the internal volume of the other reservoir; and the controller being operatively connected to the at least one sensor in the internal volume of the other reservoir and the other pump, the controller being further configured to receive a signal from the at least one sensor in the internal volume of the other reservoir indicative of whether the at least one sensor is contacting non-reflective fluid within the internal volume of the other reservoir and to operate the other pump to move non-reflective fluid from the volumetric container for storing non-reflective fluid into the internal volume of the other reservoir in response to the signal from the at least one sensor within the internal volume of the other reservoir indicating an absence of non-reflective fluid contacting the at least one sensor in the internal volume of the other reservoir.

7. The system of claim 6, the at least one sensor in the other reservoir further comprising:

a pair of sensors, each sensor in the pair of sensors being configured with a housing having at least one wall that encloses a volume and the at least one wall has a first end and a second end, a base configured to close the first end of the at least one wall of the housing, a photoemitter positioned in the base, a photodetector positioned in the base, and a prism configured to close the second end of the at least one wall of the housing, the prism having no sloped surfaces, at least one surface of the prism is parallel to the second end of the at least one wall of the housing, and the at least one surface of the prism has a width approximately equal to a width of the second end of the at least one wall of the housing to enable the photodetector to generate a signal indicative of whether a reflective fluid is contacting the prism, one of the sensors in the pair of sensors being positioned within the internal volume of the other reservoir at a location where the signal generated by the sensor indicates the non-reflective fluid level in the other reservoir is approaching a floor of the other reservoir when the signal indicates an absence of non-reflective fluid contacting the one sensor;

the other sensor in the pair of sensors being positioned within the internal volume of the other reservoir at a location where the signal generated by the other sensor indicates the non-reflective fluid level in the reservoir is approaching a ceiling of the reservoir when the signal indicates a presence of non-reflective fluid contacting the other sensor; and the controller is further configured to operate the pump in response to the signal from the one sensor indicating an absence of non-reflective fluid contacting the one sensor and to deactivate the pump in response to the signal from the other sensor indicating a presence of non-reflective fluid contacting the other sensor.

* * * * *